(12) United States Patent
Diana et al.

(10) Patent No.: US 9,525,777 B2
(45) Date of Patent: Dec. 20, 2016

(54) SYSTEM AND METHOD FOR MANAGING A COMMUNICATION SESSION

(71) Applicant: LeadPoint, Inc., Los Angeles, CA (US)

(72) Inventors: Marc L. Diana, Santa Monica, CA (US); Matthew W. Norehad, Los Angeles, CA (US)

(73) Assignee: Leadpoint, Inc., Los Angeles, CA (US)

( * ) Notice: Subject to any disclaimer, the term of this patent is extended or adjusted under 35 U.S.C. 154(b) by 0 days.

(21) Appl. No.: 14/659,335

(22) Filed: Mar. 16, 2015

(65) Prior Publication Data
US 2015/0264173 A1 Sep. 17, 2015

Related U.S. Application Data

(60) Provisional application No. 61/954,535, filed on Mar. 17, 2014.

(51) Int. Cl.
*H04M 11/00* (2006.01)
*H04M 3/51* (2006.01)

(52) U.S. Cl.
CPC .................... *H04M 3/5191* (2013.01)

(58) Field of Classification Search
CPC .... H04M 3/38; H04M 3/2218; H04M 3/2281; H04M 3/4872; G06Q 30/02; G06Q 30/0201; G06Q 30/06; G06Q 30/08; G10L 15/26

See application file for complete search history.

(56) References Cited

U.S. PATENT DOCUMENTS

| | | | |
|---|---|---|---|
| 2004/0225526 A1* | 11/2004 | Gould | G06Q 30/02 705/1.1 |
| 2006/0146997 A1 | 7/2006 | Qian et al. | |
| 2007/0271138 A1 | 11/2007 | Van Der Linden et al. | |
| 2008/0162203 A1* | 7/2008 | Shirk | G06Q 30/06 705/35 |
| 2009/0086941 A1* | 4/2009 | Altberg | G06Q 30/0246 379/114.01 |
| 2009/0240561 A1 | 9/2009 | Altberg et al. | |

(Continued)

OTHER PUBLICATIONS

PCT; Notification of Transmittal of the International Search Report and the Written Opinion of the International Searching Authority, or the Declaration; Int'l Appln. No. PCT/US 15/20912; Mailing Date: Jun. 25, 2015; 14 pages.

*Primary Examiner* — Stella L Woo
(74) *Attorney, Agent, or Firm* — Baker Botts L.L.P.

(57) ABSTRACT

In one embodiment, a method of managing a live electronic communication session comprises receiving parameters from a user. The parameters are associated with at least one communication preference of the user. The method further comprises determining a first contact profile from a plurality of contact profiles using the one or more parameters. The first contact profile comprises a first set of information and a second set of information. The method further comprises permitting the user to access the first set of information and preventing the user from accessing the second set of information. The method connects the user and a first contact associated with the first contact profile to a live electronic communication session. The method further comprises determining a duration of the live electronic communication session, and determining, using the duration of the live electronic communication session, to permit the user to access the second set of information.

17 Claims, 14 Drawing Sheets

(56) References Cited

U.S. PATENT DOCUMENTS

| | | | |
|---|---|---|---|
| 2009/0271292 A1* | 10/2009 | Khetrapal | G06Q 30/02 705/26.1 |
| 2010/0161315 A1* | 6/2010 | Melamed | G06F 17/2715 704/9 |
| 2010/0169197 A1* | 7/2010 | Canning | G06Q 30/04 705/34 |
| 2011/0258067 A1* | 10/2011 | Rowell | G06Q 30/06 705/26.2 |
| 2011/0282755 A1* | 11/2011 | Suba | G06Q 30/08 705/26.3 |
| 2013/0198290 A1 | 8/2013 | Thomas | |
| 2013/0339433 A1 | 12/2013 | Li et al. | |
| 2015/0046214 A1* | 2/2015 | Jain | G06Q 30/0201 705/7.29 |

* cited by examiner

Add to Saved Searches — 202

Name: [        ]  [Save]

Search Options

Existing orders
[Select an order...]

Existing Connections
[Select a connection...]

Select search criteria below  [Search Leads]

States (Hold the Ctrl key to select multiple states.)

Alabama
Alaska
Arizona
Arkansas
California
Colorado
Connecticut
Delaware

Select All | None

Lead Age

- ☑ 0-3 days       ☐ 45-60 days
- ☑ 4-7 days       ☐ 61-75 days
- ☐ 8-30 days      ☐ 75-90 days
- ☐ 31-45 days First | Next »   Results 1 through 50 of 561

(*Indicates voice verified leads.)

[Add to Cart]   Add [   ] leads to cart — 218, 220, 222

| | Property State | ZIP | Loan Value | Loan to Value | Credit Grade | Times Sold | Age | Price | Eligible for Return | Pay per Conversation |
|---|---|---|---|---|---|---|---|---|---|---|
| | | 204 | 206 | 208 | 210 | 212 | 214 | 216 | | |
| ☐ | CA | 92337 | $192,500.00 | 86% | Poor | 0 | 1 Hours | $4.50 | Yes | ✓ Call lead |
| ☐ | CA | 95838 | $132,500.00 | 87% | Good | 2 | 1 Hours | $12.50 | Yes | ✓ Call lead |
| ☐ | CA | 93930 | $122,500.00 | 89% | Good | 1 | 2 Hours | $8.00 | Yes | ✓ Call lead |
| ☐ | CA | 94536 | $160,000.00 | 31% | Fair | 0 | 2 Hours | $10.00 | Yes | ✓ Call lead |
| ☐ | CA | 92078 | $500,000.00 | 78% | Fair | 0 | 3 Hours | $7.30 | Yes | ✓ Call lead |
| ☐ | CA | 94704 | $510,000.00 | 104% | Excellent | 0 | 3 Hours | $16.30 | Yes | ✓ Call lead |
| ☐ | CA | 94703 | $440,000.00 | 104% | Good | 0 | 3 Hours | $16.00 | Yes | ✓ Call lead |
| ☐ | CA | 94114 | $910,000.00 | 100% | Excellent | 0 | 3 Hours | $19.30 | Yes | ✓ Call lead |
| ☐ | CA | 92139 | $271,000.00 | 96% | Poor | 0 | 4 Hours | $3.50 | Yes | ✓ Call lead |
| ☐ | CA | 94044 | $430,000.00 | 96% | Good | 0 | 4 Hours | $11.80 | Yes | ✓ Call lead |
| ☐ | CA | 95136 | $137,500.00 | 17% | Excellent | 2 | 4 Hours | $13.30 | Yes | ✓ Call lead |
| ☐ | CA | 92692 | $132,500.00 | 27% | Good | 2 | 4 Hours | $12.50 | Yes | ✓ Call lead |
| ☐ | CA | 92250 | $135,001.00 | 89% | Good | 0 | 4 Hours | $12.50 | Yes | ✓ Call lead |
| ☐ | CA | 93720 | $245,000.00 | 89% | Good | 2 | 4 Hours | $21.00 | Yes | ✓ Call lead |
| ☐ | CA | 91766 | $190,000.00 | 95% | Good | 0 | 5 Hours | $12.50 | Yes | ✓ Call lead |
| ☐ | CA | 92346 | $225,000.00 | 82% | Fair | 0 | 5 Hours | $10.00 | Yes | ✓ Call lead |
| ☐ | CA | 93446 | $115,001.00 | 38% | Fair | 0 | 7 Hours | $3.80 | Yes | ✓ Call lead |
| ☐ | CA | 90303 | $240,001.00 | 80% | Poor | 0 | 7 Hours | $4.50 | Yes | ✓ Call lead |
| ☐ | CA | 95363 | $220,001.00 | 104% | Good | 0 | 7 Hours | $16.80 | Yes | ✓ Call lead |
| ☐ | CA | 92337 | $235,000.00 | 89% | Fair | 0 | 7 Hours | $10.00 | Yes | ✓ Call lead |

FIG. 2

First | Next »    Results 1 through 50 of 3891    (*Indicates voice verified leads.)    [Add to Cart]   Add [ ] leads to cart

| | Property State | ZIP | Loan Value | Loan to Value | Credit Grade | Age | Times Sold | Price | Eligible for Return | Pay per Conversation |
|---|---|---|---|---|---|---|---|---|---|---|
| ☐ | CA | | | | | | | $9.00 | Yes | Call lead |
| ☐ | MI | | | | | | | $4.30 | Yes | Call lead |
| ☐ | KY | | | | | | | $5.00 | Yes | Call lead |
| ☐ | WA | | | | | | | $9.00 | Yes | Call lead |
| ☐ | TX | | | | | | | $3.20 | Yes | |
| ☐ | IN | | | | | | | $6.50 | Yes | Call lead |
| ☐ | GA | | | | | | | $4.10 | Yes | Call lead |
| ☐ | IN | | | | | | | $3.20 | Yes | Call lead |
| ☐ | NY | | | | | | | $9.00 | Yes | Call lead |
| ☐ | AZ | | | | | | | $3.20 | Yes | Call lead |
| ☐ | TX | | | | | | | $0.90 | Yes | Call lead |
| ☐ | MI | | | | | | | $19.80 | Yes | Call lead |
| ☐ | MO | | | | | | | $18.90 | Yes | Call lead |
| ☐ | FL | | | | | | | $18.90 | Yes | Call lead |
| ☐ | OH | | | | | | | $15.10 | Yes | Call lead |
| ☐ | FL | | | | | | | $9.00 | Yes | Call lead |
| ☐ | KY | | | | | | | $9.00 | Yes | Call lead |
| ☐ | MA | | | | | | | $19.80 | Yes | Call lead |
| ☐ | FL | | | | | | | $18.90 | Yes | Call lead |

— 302

Overlay dialog:

Pay Per Conversation

Charge for this conversation    304 — $23.20

Delivery Method [Voice Direct ▼] Edit    306
     Delivery type: Phone
     Delivery address

We will call you at    314 — ☎ (800) 965-8211

You will be asked to press 1, then we will call the consumer. Call different number 312 — [Start Call]   [Cancel]

▼ Conversation Guarantee    308

If you are unable to have a conversation with a consumer and have NOT exchanged contact information with a consumer, you can request a refund by submitting feedback after the call.

▼ Tips on calling a lead    310

- At beginning of call say, "Hi this is *Vicki Gladstone* calling about your recent refinance inquiry."
- Quickly qualify the consumer's interest then understand why they want a refinance.
- Other lenders are competing for this consumer's business. Better service and pricing matter!

*FIG. 3*

| Property State | ZIP | Loan Value | Loan to Value | Credit Grade | Times Sold | Age | Price | Eligible for Return | Pay per Conversation |
|---|---|---|---|---|---|---|---|---|---|
| CA | 95 | | | | | | | | Call lead |
| MI | 48 | Pay Per Conversation | | | | | Cancel | s | Call lead |
| KY | 42 | | | | | | | s | Call lead |
| WA | 98 | Connecting... | | | | | | s | Call lead |
| TX | 78 | 404 — 00:00 | | | | | | s | |
| IN | 46 | | | | | | | s | Call lead |
| GA | 30 | You will be billed after ten seconds of being connected with the consumer. | | | | | | s | Call lead |
| IN | 46 | ▶ Conversation Guarantee — 406 | | | | | | s | Call lead |
| NY | 14 | If you are unable to have a conversation with a consumer and have NOT exchanged contact information with a consumer, you can request a refund by submitting feedback after the call. | | | | | | s | Call lead |
| AZ | 85 | | | | | | | s | Call lead |
| TX | 79 | ▶ Tips on calling a lead — 408 | | | | | | s | Call lead |
| MI | 48 | • At beginning of call say, "Hi this is *Vicki Gladstone* calling about your recent refinance inquiry." | | | | | | s | Call lead |
| MO | 63 | • Quickly qualify the consumer's interest then understand why they want a refinance. | | | | | | s | Call lead |
| FL | 33 | • Other lenders are competing for this consumer's business. Better service and pricing matter! | | | | | | | Call lead |
| OH | 45 | | | | | | | | Call lead |

*FIG. 4*

| Property State | ZIP | Loan Value | Loan to Value | Credit Grade | Times Sold | Age | Price | Eligible for Return | Pay per Conversation |
|---|---|---|---|---|---|---|---|---|---|
| CA | 95 | | | | | | | s | Call lead |
| MI | 48 | | | | | | | s | Call lead |
| KY | 42 | | | | | | | s | Call lead |
| WA | 98 | | | | | | | s | Call lead |
| TX | 78 | | | | | | | s | |
| IN | 46 | | | | | | | s | Call lead |
| GA | 30 | | | | | | | s | Call lead |
| IN | 46 | | | | | | | s | Call lead |
| NY | 14 | | | | | | | s | Call lead |
| AZ | 85 | | | | | | | s | Call lead |
| TX | 79 | | | | | | | s | Call lead |
| MI | 48 | | | | | | | s | Call lead |
| MO | 63 | | | | | | | s | Call lead |
| FL | 33 | | | | | | | s | Call lead |
| OH | 45 | | | | | | | s | Call lead |
| FL | 33 | | | | | | | s | Call lead |
| KY | 40 | | | | | | | s | Call lead |
| MA | 02 | | | | | | | s | Call lead |
| FL | 32176 | $157,500.00 | 84% | Good | 0 | 14 Hours | $18.90 | Yes | |

Pay Per Conversation — 502

Your call has started

00:02 — 506

You will be billed after ten seconds of being connected with the consumer.

First name: Alejandra — 504
Property state: TX
ZIP: 78665

Loan value: $162,500.00
Credit grade: Poor
Loan to value: 105%

▶ Conversation Guarantee — 508

If you are unable to have a conversation with a consumer and have NOT exchanged contact information with a consumer, you can request a refund by submitting feedback after the call.

▶ Tips on calling a lead — 510

- At beginning of call say, "Hi this is *Vicki Gladstone* calling about your recent refinance inquiry."
- Quickly qualify the consumer's interest then understand why they want a refinance.
- Other lenders are competing for this consumer's business. Better service and pricing matter!

Cancel

*FIG. 5*

| | | | |
|---|---|---|---|
| ☐ CA | 95 | s | Call lead |
| ☐ MI | 48 | s | Call lead |
| ☐ KY | 42 | s | Call lead |
| ☐ WA | 98 | s | Call lead |
| ☐ TX | 78 | s | |
| ☐ IN | 46 | s | Call lead |
| ☐ GA | 30 | s | Call lead |
| ☐ IN | 46 | s | Call lead |
| ☐ NY | 14 | s | Call lead |
| ☐ AZ | 85 | s | Call lead |
| ☐ TX | 79 | s | Call lead |
| ☐ MI | 48 | s | Call lead |
| ☐ MO | 63 | s | Call lead |
| ☐ FL | 33 | s | Call lead |
| ☐ OH | 45 | s | Call lead |
| ☐ FL | 33 | s | Call lead |

602

Pay Per Conversation                                    Close

Your call did not start — 604

01:01 — 606

Unable to start call: javax.net.ssl.SSLPeerUnverifiedException: peer not authenticated

First name: Alejandra          Loan value: $162,500.00
Property state: TX             Credit grade: Poor
ZIP: 78665                     Loan to value: 105%

▶ Conversation Guarantee — 608

If you are unable to have a conversation with a consumer and have NOT exchanged contact information with a consumer, you can request a refund by submitting feedback after the call.

Filters — 802  804

Choose your filters to determine the leads you want to call.

Lead Age

☐ 0-3 Days   ☐ 4-7 Days   ☐ 8-30 Days   ☐ 31-90 Days

Filter by State or Zipcode

◉ Filter by State   ○ Filter by Zipcode

Acceptable States

| | | | |
|---|---|---|---|
| ☐ Alabama | ☐ Illinois | ☐ Montana | ☐ Rhode Island |
| ☐ Alaska | ☐ Indiana | ☐ Nebraska | ☐ South Carolina |
| ☐ Arizona | ☐ Iowa | ☐ Nevada | ☐ South Dakota |
| ☐ Arkansas | ☐ Kansas | ☐ New Hampshire | ☐ Tennessee |
| ☐ California | ☐ Kentucky | ☐ New Jersey | ☐ Texas |
| ☐ Colorado | ☐ Louisiana | ☐ New Mexico | ☐ Utah |
| ☐ Connecticut | ☐ Maine | ☐ New York | ☐ Vermont |
| ☐ Delaware | ☐ Maryland | ☐ North Carolina | ☐ Virginia |
| ☐ District of Columbia | ☐ Massachusetts | ☐ North Dakota | ☐ Washington |
| ☐ Florida | ☐ Michigan | ☐ Ohio | ☐ West Virginia |
| ☐ Georgia | ☐ Minnesota | ☐ Oklahoma | ☐ Wisconsin |
| ☐ Hawaii | ☐ Mississippi | ☐ Oregon | ☐ Wyoming |
| ☐ Idaho | ☐ Missouri | ☐ Pennsylvania | |

Check All  |  Uncheck All

Home Equity Type

☐ Loan/2nd Mortgage
☐ Line of Credit/HELOC

Check All  |  Uncheck All

Language

☑ English
☐ Spanish

Check All  |  Uncheck All

Max LTV %

XLNT [105]
GOOD [105]     NOTE: Max LTV% value defaults to 105 if a bid price is not specified.
FAIR [105]
POOR [105]

806

— 808

| Average Call Price | Your Price | | |
|---|---|---|---|
| $25.00 | $28.00 | Calculate the price of the call with the filters you've chosen. | [Calculate Price] |

[ Next ]

*FIG. 8*

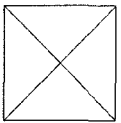
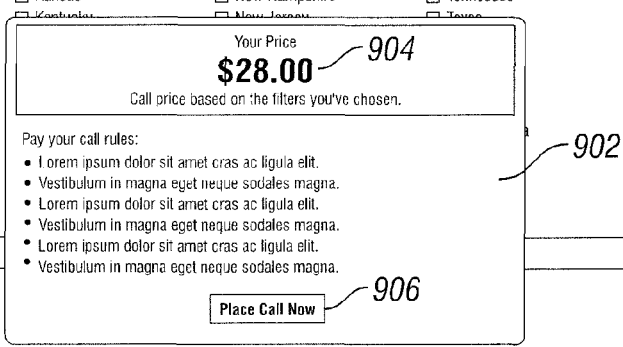
FIG. 9

LEADPOINT                    Account: Lead Buyer (974) Balance: ($8.00) Help | User Guide | Logout

| Home | My Leads | My Orders | Lead Store | Delivery Settings | Account Settings | Money Manager | Reports |

Lead Store Search   Saved Carts   Saved Searches

Pay Per Call

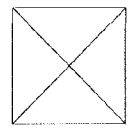

Loan Modification Leads

Lorem ipsum dolor sit amet, consectetur adipiscing elit. Cras ac ligula elit. Curabitur vitae sapien mauris. luctus pretium sapien. Vestibulum in magna eget neque sodales posuere ut in in magna.

Return Rules

Lorem ipsum dolor sit amet
Cras ac ligula elit.
Vestibulum in magna eget neque sodales magna
Learn more about pay per conversion

Filters

Choose your filters to determine the leads you want to call.

Lead Age

☐ 0-3 Days    ☐ 4-7 Days    ☐ 8-30 Days    ☐ 31-90 Days

Filter by State or Zipcode

⦿ Filter by State    ◯ Filter by Zipcode

Acceptable States

| ☐ Alabama | ☐ Illinois | ☐ Montana | ☐ Rhode Island |
| ☐ Alaska | ☐ Indiana | ☐ Nebraska | ☐ South Carolina |
| ☐ Arizona | ☐ Iowa | ☐ Nevada | ☐ South Dakota |
| ☐ Arkansas | ☐ Kansas | ☐ New Hampshire | ☐ Tennessee |
| ☐ California | | | |
| ☐ Colorado | | | |
| ☐ Connecticut | | | |
| ☐ Delaware | | | |
| ☐ District of Columbia | | | |
| ☐ Florida | | | |
| ☐ Georgia | | | |
| ☐ Hawaii | | | |
| ☐ Idaho | | | |

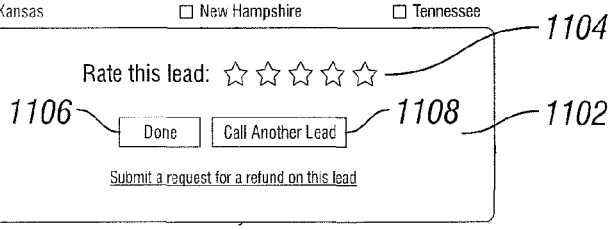

Check All | Uncheck All

Home Equity Type

☐ Loan/2nd Mortgage
☐ Line of Credit/HELOC

Check All | Uncheck All

Language

☑ English
☐ Spanish

Check All | Uncheck All

Max LTV %

XLNT [105 ⇅]
GOOD [105 ⇅]     NOTE: Max LTV% value defaults to 105 if a bid price is not specified.
FAIR [105 ⇅]
POOR [105 ⇅]

| Average Call Price | Your Price | | |
| $25.00 | $28.00 | Calculate the price of the call with the filters you've chosen. | Calculate Price |

[ Next ]

*FIG. 11*

| | Loan Value | Property State | Property Type | Loan Purpose | ZIP | Times Sold | Age | Price | Eligible for Return |
|---|---|---|---|---|---|---|---|---|---|
| ☐ | $125,000.00 | North Carolina | Office Condo | Refinance | 28677 | 0 | 6 Days | $10.00 | No |

1302

Remove Leads from Shopping Cart

Total Amount: $10.00

1. Delivery Method

No delivery options available. Create new delivery method.

2. Payment Method

⊙ Use funds in my account         $0.00

Price per lead [    ]
(Operator Only):
Override Token [    ]
(Operator Only):

Calculate Price

Note: Leads in excess of your balance will not be purchased
☐ Save this cart?

Purchase Leads

FIG. 13

SYSTEM AND METHOD FOR MANAGING A COMMUNICATION SESSION

RELATED APPLICATION

This application claims benefit under 35 U.S.C. §119(e) to U.S. Provisional Application Ser. No. 61/954,535, entitled "SYSTEM FOR COMPUTERIZED TELEPHONIC COMMUNICATION," filed Mar. 17, 2014, the entire content of which is incorporated herein by reference.

TECHNICAL FIELD

The disclosure relates generally to communication, and more specifically to systems and methods for computerized telephonic communication.

BACKGROUND

In a typical marketplace, a large number of potential customers, clients or other consumers are available for buying or otherwise acquiring vendible goods and/or services. The pool of potential consumers may include all persons as well as public and private corporations, partnerships, governmental organizations, and other such entities.

Vendible goods and/or services can span an equally large domain and may include anything from impulse purchase of items such as small candy bars to more methodically and rationally thought out acquisitions of financial instruments (e.g., home mortgages, loan refinancing packages) and/or of high-priced transportation vehicles (e.g., cars, trucks, airplanes, etc.) and/or of other properties or services.

A vendor of highly sophisticated goods and/or services (e.g., luxury automobiles with attached loan or leasing packages) will not want to waste time, energy, and money reaching out to a person who is merely looking to acquire a candy bar. Instead, the high-end vendor would like to acquire a short list pointing to motivated prospective consumers whose financial and geographic attributes indicate they may be ready to soon close on a deal for the vendor's goods and/or services. This way, the vendor may direct his or her marketing energies to the best prospects rather than wasting those energies on a more diffuse target audience.

A leads-providing industry has grown around the developing of short lists identifying optimally-ready and prospective consumers for various goods and/or services. The industry may be vertically divided into a plurality of interlinked layers including: (a) a leads generation layer, (b) a leads selling layer, (c) a leads buying layer, and (d) a leads exploitation or converting layer where, for the last layer, purchased leads are followed through on in hopes of converting the leads into consummated vendor-consumer transactions (i.e., purchases of vendor offered goods and/or services).

A variety of methods have been developed for originating leads and for conveying those leads up the vertically integrated leads market, from the originators to the ultimate purchasers and users of those leads, namely, the vendors (or vendor representatives) who wish to convert a large percentage of bought leads into actual consumer-vendor transactions.

SUMMARY

In one embodiment, a method of managing a live electronic communication session comprises receiving parameters from a user. The parameters are associated with at least one communication preference of the user. The method further comprises determining a first contact profile from a plurality of contact profiles using the one or more parameters. The first contact profile comprises a first set of information and a second set of information. The method further comprises permitting the user to access the first set of information and preventing the user from accessing the second set of information. The method connects the user and a first contact associated with the first contact profile to a live electronic communication session. The method further comprises determining a duration of the live electronic communication session, and determining, using the duration of the live electronic communication session, to permit the user to access the second set of information.

In particular embodiments, determining to permit the user to access the second set of information comprises analyzing a characterization of the live electronic communication session received from the user.

In particular embodiments, the method comprises determining the accuracy of the characterization of the communication session received from the user at least by analyzing a recording of at least a portion of the communication session. In particular embodiments, determining the accuracy of the characterization of the communication session received from the user comprises automatically performing a semantic analysis of the recording of at least a portion of the communication session.

In one embodiment, a system comprises one or more computer-readable storage media storing a plurality of contact profiles and a first interface configured to receive one or more parameters from a user. The one or more parameters are associated with at least one preference of the user. The system also comprises at least one processor configured to determine a first contact profile from a plurality of contact profiles using the one or more parameters. The first contact profile comprises a first set of information and a second set of information. The interface is further configured to permit the user to access the first set of information and prevent the user from accessing the second set of information. The processor is further configured to connect the user and a first contact associated with the first contact profile to a live electronic communication session. The processor also determines a duration of the live electronic communication session and determines, using the duration of the live electronic communication session, to permit the user to access the second set of information.

In particular embodiments, the system is configured to analyze a characterization of the live electronic communication session received from the user.

In particular embodiments, the system is configured to determine the accuracy of the characterization of the communication session received from the user at least by analyzing a recording of at least a portion of the communication session. In particular embodiments, the system is configured to automatically perform a semantic analysis of the recording of at least a portion of the communication session.

In particular embodiments, a non-transitory computer-readable storage medium has computer-readable program code configured to perform the operations of the method and/or system described above.

The present disclosure provides, in various embodiments, solutions to technological problems that exist in the leads buying and selling marketplace. For example, a lead buyer may not be satisfied with the value of purchased leads for other reasons as well. A lead buyer will not be satisfied if the lead's contact information for the potential consumer is incorrect, or the potential consumer is unreachable for some other reason. A lead buyer will not be satisfied if contact is made with the potential consumer and the potential consumer is not interested in the goods or services offered by the lead buyer, or the potential consumer does not meet certain criteria specified by the lead. A lead buyer may not feel satisfied with a purchased lead for any reason that prevents the lead buyer from successfully converting a lead into a consumer-vendor transaction. Unsatisfied buyers may result in unsold inventory in a lead exchange marketplace.

Advantages present in various embodiments of the present disclosure allow a lead buyer to pay only for leads where the lead buyer holds a conversation with a potential consumer. Although not all conversations may lead to a consumer-vendor transaction, a lead buyer will feel more satisfied with a lead that puts the lead buyer in contact with a potential customer who meets the lead buyer's criteria. Paying for conversations instead of paying for a list of leads reduces risk because it avoids initial costs associated with attempts to contact potential consumers. Paying for a conversation increases efficiency because lead buyers are only charged if they make contact with a potential consumer.

The present disclosure provides, in various embodiments, solutions to technological problems that exist in the leads buying and selling marketplace. For example, two lead buyers, such as a large mortgage company and an individual loan officer, may both purchase the same bulk data package of leads. The large mortgage company may have access to expensive auto-dialing technology enabling it to contact a majority of the shared leads before the individual loan officer is able to contact the same leads manually. In this scenario, the individual loan officer may not feel like he received fair value from the purchased leads. Small buyers may become frustrated by the volume of call attempts required to connect with shared leads. Embodiments of the present disclosure's system can address issues by facilitating more effective communication between such small buyers and the shared leads.

Other objects, features, and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the objects, features, and advantages thereof, reference now is made to the following description taken in connection with the accompanying drawings.

FIG. 2 illustrates an example of a user interface, according to a particular embodiment.

FIGS. 3-7 illustrate examples of interfaces for establishing and monitoring calls, according to particular embodiments.

FIG. 8 illustrates an example of a user interface for determining desired entities, according to a particular embodiment.

FIG. 9 illustrates an example of a user interface for matching entities, according to a particular embodiment.

FIG. 11 illustrates an example of a user interface for rating a contacted entity, according to a particular embodiment.

FIG. 13 illustrates an example of a user interface for billing related to monitored calls, according to a particular embodiment.

DETAILED DESCRIPTION

Example embodiments and their advantages can be understood by referring to FIGS. 1 through 14 of the drawings and the following description.

Figure 1:
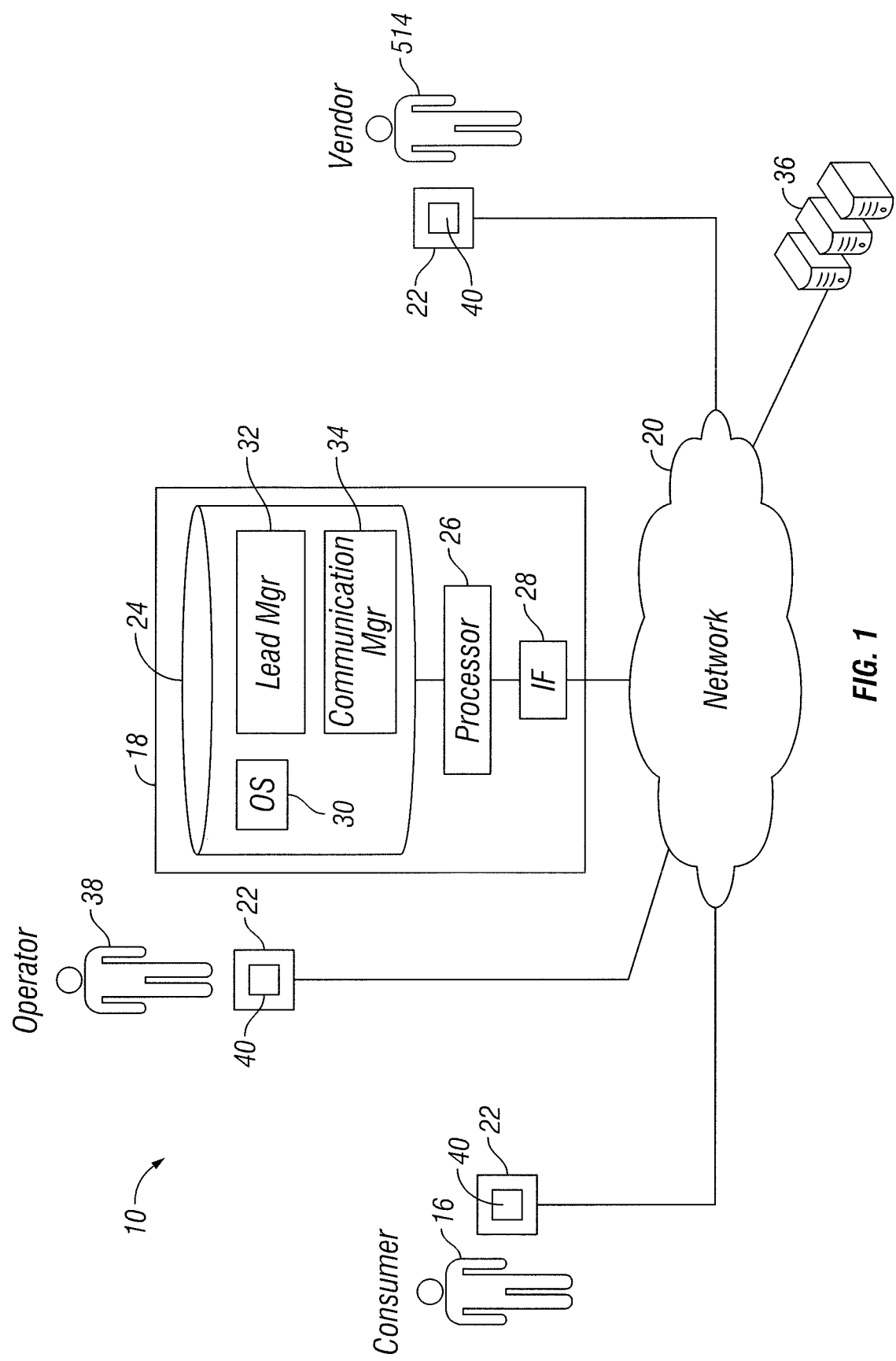
FIG. 1 illustrates an example of a system for computerized establishment of telephonic calls.

FIG. 1 illustrates an example of a system 10 for establishing communications between lead buyers 14 with potential consumers 16. As illustrated, system 10 includes lead exchange system 18 and network 20. System 10 can allow lead buyers 14 to communicate with potential consumers 16 using user devices 22 and network 20. Lead exchange system 18 facilitates connections between lead buyers 14 and potential consumers 16. Database 36 stores, either permanently or temporarily, data, operational software, or other information for system 10. Operator 38 may maintain and configure lead exchange system 18.

Although system 10 is described as an example system for establishing communications between lead buyers 14 and potential consumers 16, system 10 may generally establish a live electronic communication session between any user 14 and any contact 16.

Unless otherwise indicated, the term "lead" will be understood herein to refer to any mechanism by which a potential consumer that may have current or future prospects for purchasing or otherwise consuming one or more goods and/or services is connected directly or indirectly to a vendor of such goods and/or services (or vice versa) such that the vendor can appeal directly or indirectly to the prospective consumer to purchase or otherwise consume one or more goods and/or services offered by the vendor. Leads may take many forms including: (a) a live or on-hold telephone connection to a potentially interested consumer; (b) an ongoing Internet chat or other directed communication with a potentially interested consumer; and (c) one or more data sets (also referred to as contact profiles) that identify one or more potentially interested consumers and characteristics associated with their potential consumerism.

Lead buyer 14 represents a vendor of goods and/or services. As an example, a vendor may want to acquire a short list pointing to motivated potential consumers 16 whose financial and geographic attributes indicate they may be ready to transact for the vendor's goods and/or services. This way, the vendor may direct his or her marketing energies to the best prospects rather than wasting those energies on an uninterested audience. A list of potential customers may also be known as a list of leads, and a vendor who purchases a list of leads may be known as a lead buyer. In particular embodiments, vendible goods may include physical goods (e.g., cars, trucks, boats, planes, etc.), commodities (e.g., fruits, grains, livestock, etc.), financial instruments (e.g., investments, mortgages, auto loans, etc.), and any suitable product for sale. Although one lead buyer 14 is illustrated, any number of lead buyers 14 may participate in system 10.

Potential consumer 16 represents a potential consumer of goods and/or services offered for sale by lead buyer 14. Although one potential consumer 16 is illustrated, any number of potential consumers 16 may participate in system 10. In particular embodiments, potential consumers 16 may comprise a pool of reachable consumers for a given good or service. Pool of potential customers 16 may be segmented in any of a variety of ways depending on product, price range, and/or other context-setting parameters. The context-setting parameters may include: (a) an associated class or range or mixture of products involved (e.g., automobile, loan refinance service, perishable fruits, etc.); (b) a price range of the product bundle; (c) a longevity of the lead, meaning how long the prospect for closing a deal remains viable (e.g., must be closed within a day, a week, 3 months, a year, etc.); (d) a geographic location of the prospective consumer; (e) a financial well-being of the prospective consumer (e.g., credit rating); (f) motivation of the prospective consumer to soon close a deal; and so forth.

Lead exchange system 18 represents any components operable to facilitate connections between lead buyers 14 and potential consumers 16. Lead exchange system 18 may maintain a collection of active leads. Lead buyer 14 may purchase a lead through lead exchange system 18 and lead exchange system 18 may initiate a phone call between lead buyer 14 and potential consumer 16. Lead exchange system 18 may maintain billing records related to purchased leads and may maintain statistics related to activity of lead buyers 14 and potential consumers 16. Lead buyer 14 may interact with lead exchange system 18 through a user interface, which may be referred to as a lead store.

Lead originators devise their own methods for generating leads, capturing leads, and introducing leads into lead exchange system 18. Examples of origination methods may include: (a) cold calling potential consumers 16 via a manual or automated call centers, (b) offering prizes via mass-transmitted emails, (c) operating prospect-attracting web sites such as portals, etc. that attract the desired kinds of persons to the site such that the visitor can then be directed to a site where the visitor is encouraged to fill out a lead generating form, and (d) culling through long lists provided by other lead generators so as to generate shorter and more reliable lists. Lead exchange system 18 may obtain leads from multiple sources.

Lead exchange system 18 may include any suitable type of computer system, such as a network server, any remote server, a mainframe, a host computer, a workstation, a web space server, a personal computer, a file server, a virtual device, or any other device that may electronically process information. The operations of lead exchange system 18 may be performed by any combination of one or more components at one or more locations. Lead exchange system 18 comprises memory 24, processor 26, and network interface 28.

In particular embodiments, lead exchange system 18 may integrate with one or more other systems that are used to track interactions with potential customers such as a customer relationship management (CRM) tool. Lead exchange system 18 may present an application programming interface to allow interaction with such systems. Lead exchange system 18 may automatically share notes or feedback information with such systems. Lead exchange system 18 may compare leads with existing contacts in such systems used by lead buyer 14 to ensure lead buyer 14 is not paying for duplicate leads, or about to contact a previously contacted lead. Lead exchange system 18 may compare leads by comparing name, address, phone number, email address, or any other suitable attribute associated with a lead.

In particular embodiments, lead exchange system 18 may provide advantages because lead exchange system 18 controls communication between lead buyer 14 and potential consumer 16. Lead exchange system 18 may ensure that competing lead buyers 14 do not simultaneously access the same leads or contact the same potential consumers 16. Lead exchange system 18 may ensure that potential consumers 16 are not contacted excessively by lead buyers 14. Lead exchange system 18 may ensure that both large institutional lead buyers 14 and solo lead buyers 14 both receive value from their purchased leads.

In some embodiments, network interface 28 represents any components operable to receive information from network 20, transmit information through network 20, perform processing of information, communicate to other devices, or any combination of the preceding, and may be implemented using any suitable combination of hardware, firmware, and software. For example, network interface 28 may receive information from user devices 22, database 36, and lead exchange system 18. As another example, network interface 28 may communicate information for display to a lead buyer 14, potential consumer 16, or operator 38 on user devices 22. Network interface 28 represents any port or connection, real or virtual, including any suitable hardware and/or software, including protocol conversion and data processing capabilities, to communicate through a LAN, a metropolitan area network (MAN), a WAN, or other communication system that allows lead exchange system 18 to exchange information with network 20 and other components of system 10.

In some embodiments, processor 26 communicatively couples to network interface 28 and memory 24, and controls the operation and administration of lead exchange system 18 by processing information received from network interface 28 and memory 24. For example, processor 26 executes operating system 30 to manage resources and provide services for one or more applications and/or computer programs. Processor 26 may be a programmable logic device, a microcontroller, a microprocessor, any processing device, or any combination of the preceding. Processor 26 may represent more than one processor.

In some embodiments, memory 24 stores, either permanently or temporarily, data, operational software, or other information for processor 26 using computer-readable media. Memory 24 includes any suitable combination of volatile or non-volatile local or remote devices suitable for storing information. For example, memory 24 may include RAM, ROM, magnetic storage devices, optical storage devices, or any other information storage device or a combination of these devices. While illustrated as including particular modules, memory 24 may include any information for use in the operation of lead exchange system 18.

In some embodiments, memory 24 comprises operating system 30, lead manager 32, and communication manager 34. Operating system 30 represents any suitable set of instructions, logic, or code embodied in a computer readable storage medium and operable to manage resources and provide services for one or more applications and/or computer programs. Operating system 30 may include any suitable operating systems, such as IBM's zSeries/Operating System (z/05), MS-DOS, PC-DOS, MAC-OS (such as MAC OS X), WINDOWS, UNIX, OpenVMS®, LINUX®, SOLARIS, ADVANCED INTERACTIVE EXECUTIVE (AIX), HP-UX®, UBUNTU®, DEBIAN®, or any other appropriate operating systems, including future operating systems.

In some embodiments, lead manager 32 represents any suitable set of instructions, logic, or code embodied in a computer readable storage medium and operable to facilitate lead trading. Lead manager 32 may be implemented using any suitable combination of hardware, firmware, and software. Lead manager 32 may facilitate lead trading by presenting leads to lead buyers 14. For example, lead buyer 14 may browse a listing of individual leads and request a conversation with a potential consumer 16. As another example, lead manager 32 may search for leads matching criteria specified by lead buyer 14. If lead manager 32 identifies a potential consumer 16 that matches the criteria, lead manager 32 may prompt lead buyer 14 to contact potential consumer 16.

In some embodiments, lead manager 32 may perform rule checks to determine whether lead buyer 14 is allowed to contact potential consumer 16. For example, lead manager 32 may verify that certain parameters (e.g., income, product interest, geographical location, credit score, or other suitable parameters) associated with potential consumer 16 match criteria specified by lead buyer 14. Lead manager 32 may also verify that another lead buyer 14 has not recently contacted the same potential consumer 16. Lead manager 32 may verify that a potential contact would comply with legally mandated time of day calling regulations.

Lead manager 32 may initiate a telephone conversation (via communication manager 34) between lead buyer 14 and potential consumer 16. Lead manager 32 can charge lead buyer 14 for the conversation in various manners. For example, lead manager 32 can charge lead buyer 14 if the telephone conversation with potential consumer 16 is actually established rather than the call not being answered or if the call was answered by a voicemail system.

In some embodiments, communication manager 34 represents any suitable set of instructions, logic, or code embodied in a computer readable storage medium and operable to facilitate communication between lead buyer 14 and potential consumer 16. Communication manager 34 may be implemented using any suitable combination of hardware, firmware, and software. In particular embodiments, communication manager 34 may include an interactive voice recognition (IVR) process, an automated call processing unit, a manual call processing unit, or any suitable man-machine interface. Communication manager 34 may be operable to record communications for later analysis and review.

In particular embodiments, an IVR process may allow lead buyer 14 or potential consumer 16 to respond with touch-tone and/or voice responses to predefined question sequences generated by the IVR process. Other terms for IVR may include VRU-voice recognition units, ISR-interactive speech recognition and so forth. The units may include automated dialers as well as automated voice interface with potential consumers.

In particular embodiments, communication manager 34 may be configured to detect whether a human or an answering machine answers a call. Communication manager 34 may perform call handling procedures such as placing calls on hold, transferring calls, or any other suitable call handing procedure. Communication manager 34 may bridge connections between disparate communications networks. For example, communication manager 34 may contact potential consumer 16 via a wired telephone network. When potential consumer 16 answers, communication manager 34 may contact lead buyer 14 via a call center private branch exchange. When both potential consumer 16 and lead buyer 14 are on the line, communication manager 34 connects both parties. Disparate communication networks, such as packet-based networks and the public switched telephone network may not provide the same monitoring functionality. Communication manager 34 may provide functionality to normalize call monitoring features across multiple networks.

In particular embodiments, communication manager 34 may comprise an auto-dialer feature. Communication manager 34 may provide auto-dialing features as a service to lead buyer 14. For example, lead buyer 14 may purchase a set of leads from lead exchange system 18. Communication manager 34 may repeatedly attempt to contact the purchased leads and notify lead buyer 14 when a potential consumer 16 is available for a conversation. As another example, lead buyer 14 may indicate one or more parameters for desired leads and communication manager may call leads that correspond to those parameters until one is found that is ready to speak with lead buyer 14; lead buyer 14 may then be billed for the lead that was on the call.

In particular embodiments, communication manager 34 may mask caller identification information from one or both calling parties. Masking caller identification information is advantageous in the scenario where lead exchange system 18 only charges lead buyer 14 for a successful conversation. Masking caller identification information prevents either party from obtaining the other party's contact information until a successful (and billable) conversation is completed. Masking caller identification is one example of preventing a user from accessing particular information associated with a contact profile.

In particular embodiments, communication manager 34 may provide call feedback to lead manager 32. For example, communication manager 34 may provide information regarding call duration or call termination disposition to lead manager 32. Lead manager 32 may use the call feedback information to make billing decisions (e.g., charge for call duration greater than a certain amount of seconds, or do not charge for contact with an answering machine). In particular embodiments, communication manager 34 may, during or after a call, solicit feedback from lead buyer 14 regarding the call disposition. Communication manager 34 may receive the characterization of the call (e.g., wrong number, wrong contact information, contact not available, or any other suitable characterization of the call) from lead buyer 14 and communicate that information to lead manager 32.

Examples of communication mechanisms that communication manager 34 may use include traditional telephony interfaces, TCP/IP or similar networking protocols in general, HTTP based interfaces, SMTP or other email interfaces such as SMS, FTP or other data transfer protocols, Web Service protocols such as SOAP, and so forth. While various embodiments of the present disclosure discuss setting up a phone call between lead buyer 14 and potential customer 16, other types of electronic communication sessions may be used aside from, or in addition to, telephone calls. Such electronic communication sessions include: e-mail, text messaging, video conferencing, file transfers, bulletin board sessions, and chat sessions (e.g., chat rooms or instant messaging). A live electronic communication session can be a telephone call, packet-based telephone call (e.g., a Voice-over-IP call), video call, chat session, or any of the other methods of electronic communication described herein.

In some embodiments, database 36 represents any components that may store information used by lead exchange system 18. For example, database 36 may store lead information, contact profiles, user account information, transaction information, billing information, feedback information, call recordings, call transcripts, and any other suitable information or combination of information. Database 36 may include a network server, any remote server, a mainframe, a host computer, a workstation, a web space server, a personal computer, a file server, a virtual device, or any other device that may store information used by lead exchange system 18. In particular embodiments, database 36 includes any suitable combination of volatile or non-volatile local or remote devices suitable for storing information. For example, database 36 may include RAM, ROM, magnetic storage devices, optical storage devices, or any other information storage device or a combination of these devices. The functions of database 36 may be performed by any combination of one or more servers or other components at one or more locations. In the embodiment where the module is a server, the server may be a virtual or physical server. The server may include one or more servers at the same or remote locations. Database 36 may provide information for view by a user. Although system 10 illustrates database 36 as separate from lead exchange system 18, in particular embodiments, database 36 may be part of lead exchange system 18. Database 36 may be a part of any suitable component shown in system 10.

In particular embodiments, information about potential consumer 16 is stored in a contact profile associated with potential consumer 16. Lead manager 32 may maintain a pool of contact profiles stored in database 36. A contact profile may comprise first and second sets of information. The first set of information may comprise information sufficient for a user to have an introductory conversation with a contact (e.g., first name, product interests, credit rating, etc.), but does not comprise data specific enough for the user to establish communication with the contact outside of system 10. The second set of information may comprise information for establishing communication (e.g., full name, phone number, mailing address, email address, electronic identifier, etc.) with a contact. Lead manager 32 is operable to facilitate a live electronic communication session between a user and a contact where the user is able to view the first set of information before the call, but does not receive the second set of information until lead manager 32, as an example, obtains an indication that the live electronic communication session was successfully established.

For example, prior to facilitating a live electronic communication session between user 14 and a contact 16, lead manager 32 may permit user 14 to access (e.g., view on a display, receive from an Internet site, import to a CRM tool or address book, or any other suitable method of obtaining data) the first set of information. After a successful live electronic communication session between user 14 and contact 16 and after user 14 agrees to be charged for the electronic communication session, lead manager 32 may permit user 14 to access the second set of information.

In some embodiments, network 20 represents any network operable to facilitate communication between various components of system 10, such as user devices 22, database 36, and lead exchange system 18. Network 20 may include any interconnecting system capable of transmitting audio, video, signals, data, messages, or any combination of the preceding. Network 20 may include all or a portion of a public switched telephone network (PSTN), a public or private data network, a LAN, a MAN, a WAN, a local, regional, or global communication or computer network, such as the Internet, a wireline or wireless network, an enterprise intranet, or any other communication link, including combinations thereof, operable to facilitate communication between the components. Although only one network 20 is illustrated, system 10 may comprise multiple data and telecommunication networks.

In some embodiments, operator 38 represents an administrative user of lead exchange system 18. Operator 38 may load new leads into lead exchange system 18, remove stale leads, configure information associated with user accounts, set prices associated with leads, configure access restrictions, run reports, perform system backups or server maintenance, or any other suitable functions associated with the operation of lead exchange system 18.

In particular embodiments, operator 38 may perform quality assurance operations. Operator 38 may review and analyze recorded portions of a phone call between lead buyer 14 and potential consumer 16 to determine whether feedback from lead buyer 14 regarding the conversation is accurate. For example, lead buyer 14 may indicate potential consumer 16 was not interested and no contact information was exchanged. Operator 38 may review a recording of the call, and upon analysis of the recording, may verify the parties did not exchange contact information. In particular embodiments, analysis may include listening to an audio recording or reviewing a transcript. Communication manager 34 can facilitate this by causing calls to be recorded and including information regarding the calls (such as the identities of the parties, the phone numbers used in the calls, and the duration of the calls) to operator 38.

In particular embodiments, determining whether lead buyer 14 should be charged for the call may be automatically performed by lead exchange system 18 (e.g., using voice analysis software). Lead exchange server 18 may analyze the audio stream or transcribe voice to text for either real time or post-call analysis. Lead exchange server 18 may perform semantic analysis on the call based on keywords, semantic inferences, phone numbers, addresses, frequencies or any suitable indicator of call content (e.g., those that identify an unanswered call, a call answered by voicemail, or a call that ended quickly due to dialing a wrong number).

In particular embodiments, operator 38 may run reports. Operator 38 may run a report to help operator 38 determine the validity of a conversation. Operator 38 may view a list of leads needing review by lead buyer 14. The report may be filterable and include fields such as lead id, phone number, first name, last name, buyer name, lead date of entry (DOE) in the lead database, transfer date, a link to a review screen, and/or other suitable fields in various embodiments. Operator 38 may run a report to view information about calls. The report may be filterable and include fields related to a call such as start date, end date, buyer, product, purchase date, call attempts, disconnect attempts, abandons, successful transfers, buyer rejects, average call duration, and/or other suitable fields in various embodiments.

In some embodiments, user device 22 represents any components (hardware and/or software) that may display or communicate information to a user, such as lead buyer 14, potential consumer 16, and operator 38. User device 22 may include a personal computer, a workstation, a laptop, a wired telephone, a wireless or cellular telephone, an electronic notebook, a personal digital assistant, or any other device (wireless, wireline, or otherwise) capable of receiving, processing, storing, and/or communicating information with other components of system 10 in order to display or communicate information to a user. User device 22 may further allow a user to request information from other user devices 22, lead exchange system 18, and database 36. For example, lead buyer 14 may want to purchase a lead. Lead buyer 14 may communicate such a request (using user device 22) to lead exchange system 18, causing lead exchange system 18 to provide such information for view by lead buyer 14. User device 22 may comprise a user interface, such as a display, a microphone, keypad, or other appropriate terminal equipment usable by a user.

In particular embodiments, user device 22 may be a mobile device. Lead buyers 14 using a mobile user device 22 may take advantage of location-based features of user device 22. For example, lead exchange server 18 may automatically determine what potential consumers 16 are within a certain distance of user device 22.

User device 22 may display a graphical user interface 40 to allow a lead buyer 14 to view lead information or communicate with potential consumer 16. Graphical user interface 40 may include any graphical interface that allows the user to view the lead information, request particular information, communicate with database 36, or any combination of the preceding. Graphical user interface 40 may be accessible to a user through a web browser, a mobile app, or any suitable portlet, in particular embodiments.

Graphical user interface 40 may display any information provided by lead exchange system 18. Examples of particular embodiments are described with reference to FIGS. 2-13.

As an example of operation, a particular embodiment is described in relation to mortgage broker 14 (lead buyer 14 or user 14) and potential mortgagee 16 (potential consumer 16 or contact 16). Mortgage broker 14 may be interested in contacting potential mortgagee 16. Mortgage broker 14 may search a lead store of lead exchange system 18 for a lead.

Figure 14:
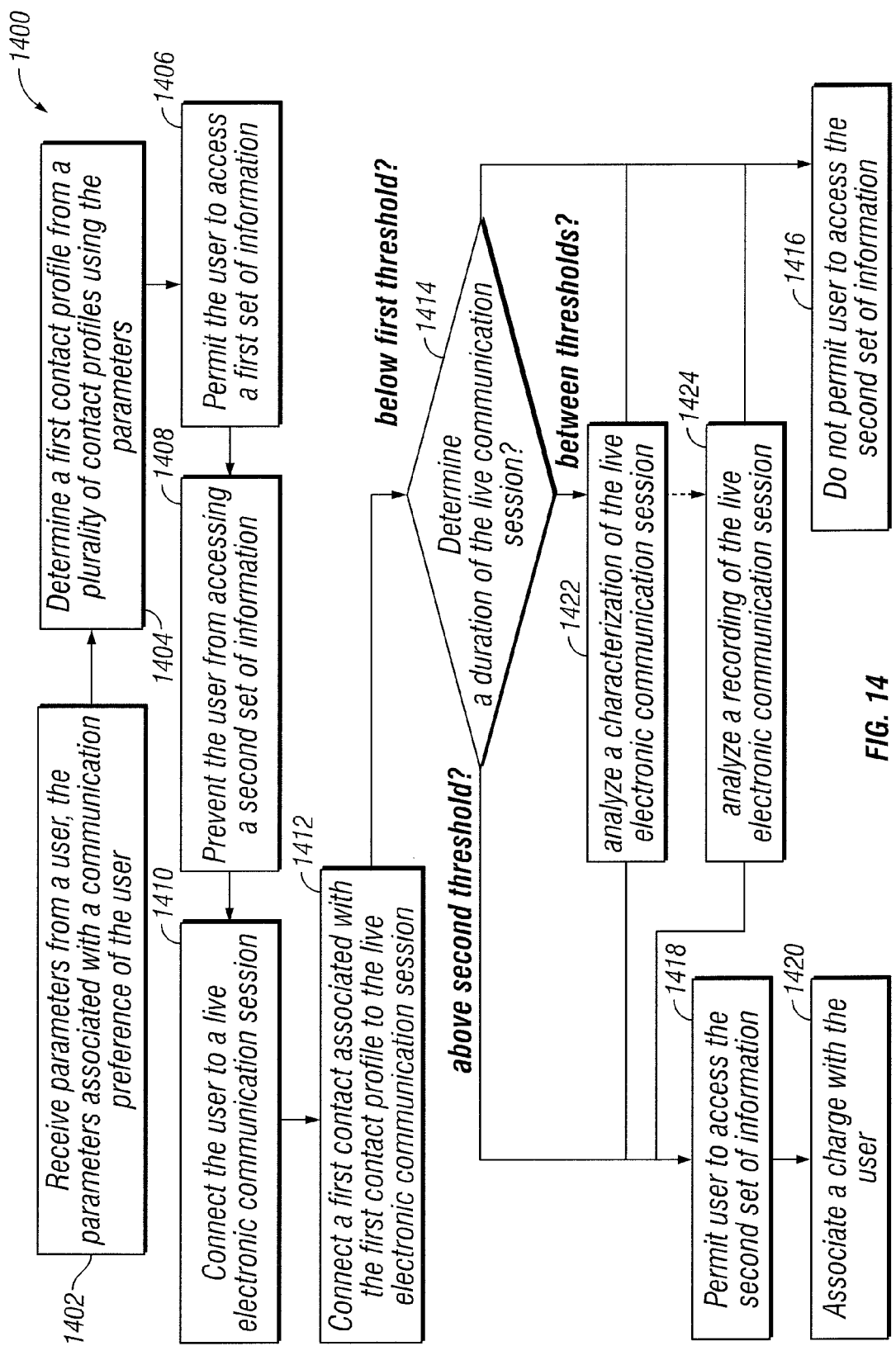
FIG. 14 is a flow diagram of an example method of managing a live electronic communication session.

FIG. 14 is a flow diagram of an example method of managing a live electronic communication session. In particular embodiments, one or more steps of method 1400 may be performed by components of system 10 described with reference to FIGS. 1-13.

The method begins at step 1402 where, in some embodiments, the lead exchange system receives parameters from a user, such as lead buyer 14. The received parameters are associated with a communication preference of the user. For example, lead buyer 14 may prefer to contact leads based on any number of parameters such as state and zip code of potential consumer 16, age or sales history of a lead, price of a lead, or any other suitable parameter. Additional examples are described with reference to FIG. 2 below.

A communication preference may refer to any of the filters, selection criteria, or other methods of choosing a lead described in this disclosure. In particular embodiments, a communication preference may also refer to a preferred communication medium. As a particular example, lead buyer 14 may submit a communication preference to contact leads the state of Texas that are less than three days old.

At step 1404, in some embodiments, the lead exchange system determines a first contact profile from a plurality of contact profiles using the parameters. For example, lead exchange system 18 may store a plurality of contact profiles associated with each of its leads. Lead exchange system 18 may search through its plurality of contact profiles for profiles that match the parameters submitted by lead buyer 14, such as all contact profiles for potential consumers 16 that are in Texas and the lead is less than three days old. Additional examples are described with reference to FIGS. 2 and 8.

At step 1406, in some embodiments, the lead exchange system permits the user to access a first set of information. For example, lead buyer 14 may view a list of potential consumers 16 whose contact profiles matched the given parameters, but lead buyer 14 may only be able to access (e.g., view, retrieve, make use of, etc.) particular information (e.g., first name, general location, demographics, etc.) about potential consumers 16. Additional examples are described with reference to FIGS. 2-11.

At step 1408, in some embodiments, the lead exchange system prevents the user from accessing a second set of information. For example, lead buyer 14 may not access contact information, or personally identifying information from which contact information could be determined, for potential consumers 16. Lead exchange system 18 is operable to manage electronic communication sessions so that communication is possible without lead buyer 18 being aware of contact information for potential consumer 16. Additional examples are described with reference to FIGS. 2-11.

At step 1410, in some embodiments, the lead exchange system connects the user to a live electronic communication session. For example, lead exchange system 18 may initiate a telephone call towards lead buyer 14.

Lead exchange system 18 may attempt to contact one of the potential consumers 16 whose contact profile matches the selection criteria of lead buyer 14. In particular embodiments, lead exchange system 18 may select the first potential consumer 16 from a list of matching potential consumers, or lead exchange system may attempt to contact potential consumers 16 and select the first potential consumer that answers the phone. Additional examples are described with reference to FIGS. 3-7.

At step 1412, in some embodiments, the lead exchange system connects the first contact to the live electronic communication session. For example, lead exchange system 18 may connect potential consumer 16 to the telephone call initiated with lead buyer 14 in the previous step.

In particular embodiments, lead buyer 14 and potential consumer 16 may communicate for a duration of time. The duration of the electronic communication session may be short if potential consumer 16 is not home or if potential consumer 16 is not a good lead. Lead buyer 14 may characterize such an electronic communication session as unsuccessful. The duration of the electronic communication session may be longer if potential consumer 16 is a good lead and lead buyer 14 has a successful conversation with potential consumer 16. Additional examples are described with reference to FIGS. 3-7.

At step 1414, in some embodiments, the lead exchange system determines a duration of the live electronic communication session. In particular embodiments, if the duration is below (or at or below) a first threshold, then the electronic communication session may be determined to be unsuccessful and method 1400 continues to step 1416.

At step 1416, in some embodiments, the lead exchange system does not permit the user to access the second set of information. For example, the electronic communication session is determined to be unsuccessful and thus lead buyer 14 is not permitted access to contact information for potential consumer 16. In particular embodiments, lead buyer 14 is not charged for the unsuccessful lead.

Returning to step 1414, in particular embodiments, if the duration exceeds (or meets or exceeds) a second threshold, then the electronic communication session may be determined to be successful and method 1400 continues to step 1418. Additional examples are described with reference to FIG. 6.

At step 1418, in some embodiments, the lead exchange system permits the user to access the second set of information. For example, the electronic communication session is determined to be successful and thus lead buyer 14 is permitted access to contact information for potential consumer 16. Thus, lead buyer 16 may have additional contact with potential consumer 16 in the future. Additional examples are described with reference to FIG. 7.

At step 1420, in some embodiments, the lead exchange system associates a charge with the user. For example, lead buyer 14 experienced a successful electronic communication session with potential consumer 16 and lead exchange system 18 may charge lead buyer 14 the advertised price for the lead. In particular embodiments, even if the duration exceeds the second threshold, lead buyer 14 may characterize the electronic communication session as unsuccessful, in which case lead buyer 14 may request a refund. Additional examples are described with reference to FIGS. 2-13.

Returning to step 1414, in particular embodiments, if the duration is between the first threshold and the second threshold, method 1400 continues to step 1422.

At step 1422, in some embodiments, the lead exchange system analyses a characterization of the live electronic communication session. For example, for calls where the duration is between a first threshold and a second threshold, lead exchange system 18 may not automatically determine whether the call was successful. In particular embodiments, lead buyer 14 may submit a characterization of the call. The characterization may include feedback regarding the disposition of the call. For example, if the call was answered, but after a short conversation lead buyer 14 determines the party that answered the phone is not potential consumer 16, then lead buyer 14 may leave feedback characterizing the call as unsuccessful. As another example, if potential consumer 16 is interested but does not have time for a conversation, potential consumer 16 may exchange contact information with lead buyer 14 and lead buyer 14 may leave feedback characterizing the call as successful. Additional examples are described with respect to FIGS. 7, 11 and 12.

At step 1424, in some embodiments, lead exchange system 18 may analyze a recording of the live electronic communication session. For example, lead buyer 14 may request a refund. In particular embodiments, operator 18 may analyze a recording of the live electronic communication session to determine whether a refund is due (e.g., the parties did not exchange contact information). The recording may be an audio recording, transcript, or any other suitable record of the electronic communication session.

In particular embodiments, lead exchange system 18 may automatically analyze the recording of the live electronic communication session by performing semantic analysis, such as keyword identification, detecting semantic inferences, or any of the other semantic analysis methods described herein.

Modifications, additions, or omissions may be made to the steps illustrated in FIG. 14. Additionally, one or more steps may be performed in parallel or in any suitable order.

FIG. 2 illustrates an example of a user interface offering leads for sale, according to a particular embodiment. FIG. 2 illustrates example user interface 202 of a lead store of lead exchange system 18. User interface 202 lists information about leads for sale. The information may include state 204 and zip code 206 in which potential mortgagee 16 owns or wants to buy property, loan amount 208, loan to value ratio 210, credit rating 212, number of times the lead has been sold 214, to whom a lead has been sold, age of the lead 216, price for the lead 218, whether the lead is eligible for a return 220, and link 222 to initiate contact with potential mortgagee 16.

Mortgage broker 14 may click on link 222 to call potential mortgagee 16. In particular embodiments, if potential mortgagee 16 is not available then mortgage broker 14 may see a message indicating potential mortgagee 16 is not available to call. Potential mortgagee 16 may not be available to call for reasons including: (a.) another mortgage broker 14 contacted potential mortgagee 16 within a certain time period (e.g., the last hour); (b.) lead exchange server 18 contacted potential mortgagee 16 within a certain time period (e.g., the last hour); (c.) the property state of potential mortgagee 16 is in a time zone where the current time is not within legal telemarketing hours (e.g., 8 a.m.-9 p.m.); (d.) the primary phone number area code of potential mortgagee 16 is in a time zone where the current time is not within legal telemarketing hours; or (e.) any other suitable availability rule known to lead exchange system 18. If potential mortgagee 16 is available, mortgage broker 14 may see a pop-up box displaying pay per conversation details.

FIG. 3 illustrates an example of an interface displaying details about a call, according to a particular embodiment. For example, interface 302 may provide mortgage broker 14 with more information about contacting a particular lead. As an example, interface 302 may display a price 304 for holding a conversation with potential mortgagee 16; a voice delivery option 306 (if no voice delivery option exists, mortgage broker 14 will see an option to create a delivery option and mortgage broker 14 may need to return to the lead store and start over); conversation guarantee 308 explaining that if mortgage broker 14 is not able to have a conversation with potential mortgagee 16 and mortgage broker 14 has not exchanged contact information with potential mortgagee 16 then mortgage broker 14 may request a refund by submitting feedback after the call; helpful tips 310 such as how mortgage broker 14 may introduce himself to potential mortgagee 16 and a suggestion to quickly determine an interest level of potential mortgagee 16; and "Start Call" button 312. The interface may also display the contact phone number 314 of mortgage broker 14. The phone number displayed may be populated with the last number used by mortgage broker 14, with a company phone number associated with mortgage broker 14, or any with suitable phone number associated with mortgage broker 14. Interface 302 may display an input box for mortgage broker 14 to enter a phone number. When mortgage broker 14 clicks "Start Call" button 312, lead exchange system 18 may display an interface that indicates the call is in a connecting state.

FIG. 4 illustrates an example of an interface indicating a call is in a connecting state, according to a particular embodiment. For example, interface 402 may display information indicating duration of the connection attempt 404 and information mortgage broker 14 may want to review before a connection is made. As an example, the interface may display a timer, conversation guarantee 406, helpful hints 408, or any other suitable information.

In particular embodiments, when mortgage broker 14 clicks "Start Call" button 312 of FIG. 3, lead exchange system 18 may initiate a call to mortgage broker 14. Mortgage broker 14 may see incoming caller identification information associated with lead exchange system 18, such as a customer service number associated with lead exchange system 18. Lead exchange system 18 may begin recording the call up to a fixed duration of time (e.g., 120 seconds) or indefinitely. If mortgage broker 14 does not answer after a number of rings (e.g., 6), lead exchange system 18 may terminate the call and display a call failed message. If mortgage broker 14 answers, lead exchange system 18 may prompt mortgage broker 14 to press a button (or any suitable input) to initiate a call to potential mortgagee 16. After mortgage broker 14 presses the button, lead exchange system 18 may initiate a call to potential mortgagee 16. Mortgage broker 14 may hear a message such as "please wait while we contact the consumer." Mortgage broker 14 may hear the phone ringing. If potential mortgagee 16 answers, lead exchange system 18 connects mortgage broker 14 and may display an interface displaying information associated with the call.

FIG. 5 illustrates an example of an interface displaying information associated with a started call, according to a particular embodiment. For example, interface 502 may display information mortgage broker 14 may find usable during the call. As an example, interface 502 may display information 504 about potential mortgagee 16, timer 506 indicating the duration of the call, conversation guarantee 508, helpful hints 510, or any other suitable information. Mortgage broker 14 needs at least a minimal subset of information about potential mortgagee 16 to handle the initial sales conversation, but lead exchange system 18 cannot share full lead information with mortgage broker 14 without charging for the data. Therefore, interface 502 may only display a limited data set to facilitate an initial conversation. Lead exchange server 18 may deliver a full data set when lead exchange server 18 determines to charge for a transaction.

Mortgage broker 14 may begin a conversation with potential mortgagee 16. After a determined amount of time (e.g., 10 seconds), lead exchange system 18 may charge mortgage broker 14 unless lead exchange system 18 later determines the conversation is invalid for other reasons described below.

If potential mortgagee 16 does not answer because the phone number is not in service or otherwise non-functional, lead exchange system 18 may end the call and may remove the lead from the lead store. Lead exchange system 18 may display an interface indicating the call did not start and may not charge mortgage broker 14 for the transaction.

FIG. 6 illustrates an example of an interface indicating a call did not start, according to a particular embodiment. For example, interface 602 may display information 604 about why the call failed, timer 606 indicating the duration of the call attempt, a conversation guarantee 608, helpful hints, or any other suitable information.

If a voicemail answers instead of potential mortgagee 16, mortgage broker 14 may hang up and lead exchange system 18 may not charge mortgage broker 14 for the transaction. However, if mortgage broker 14 leaves a message with his contact information, lead exchange system 18 may charge mortgage broker 14 for the transaction.

After the call, mortgage broker 14 may see an interface indicating the call is complete.

Figure 7:
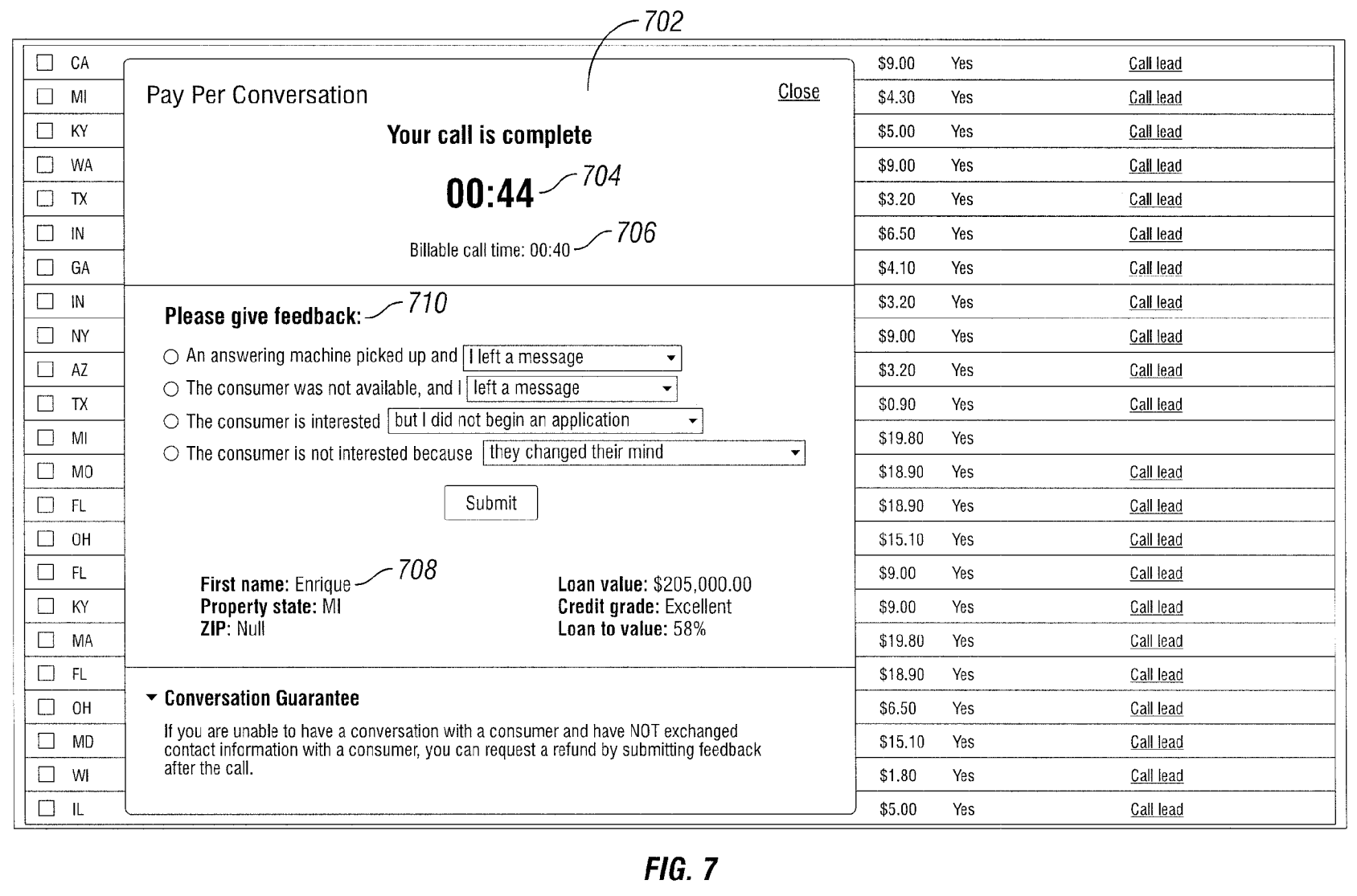

FIG. 7 illustrates an example of an interface indicating a call is complete, according to a particular embodiment. For example, interface 702 may provide final call status information to mortgage broker 14 and provide an option for mortgage broker 14 to submit additional information about the call. As an example, the interface may display timer 704 indicating the duration of the call, timer 706 indicating the billable duration of the call, information 708 about potential mortgagee 16, and feedback form 710. Feedback form 710 may include options to indicate: "An answering machine picked up" with a dropdown to indicate "I left a message" or "I did not leave a message"; "The consumer was not available" with a dropdown to indicate "left a message" or "did not leave a message"; "The consumer is interested" with a dropdown to indicate "but I did not begin an application," "and began or completed an application," or "but asked for a call back later"; and "The consumer is not interested because" with a dropdown to indicate "they changed their mind," "they have chosen another company," "they never made an online inquiry," "they hung up," or "they are interested in a different product." In particular embodiments, feedback form 710 may include a single dropdown list with a list of feedback options. In particular embodiments, mortgage broker 14 may not exit the screen without first submitting feedback.

In particular embodiments, when mortgage broker 14 clicks "Start Call" button 312 of FIG. 3, lead exchange system 18 may initiate a call to potential mortgage 16. Potential mortgagee 16 may see incoming caller identification information associated with lead exchange system 18, such as a customer service number associated with lead exchange system 18. Lead exchange system 18 may begin recording the call up to a fixed duration of time (e.g., 120 seconds) or indefinitely. If potential mortgagee 16 does not answer after a number of rings, lead exchange system 18 may terminate the call and display a call failed message. If potential mortgagee 16 answers, lead exchange system 18 may play a message such as "please hold while we connect you with a mortgage specialist; this call may be recorded for quality assurance purposes" and then play hold music. Lead exchange system 18 may then initiate a call to mortgage broker 14. Mortgage broker 14 may see incoming caller identification information associated with lead exchange system 18, such as a customer service number associated with lead exchange system 18. If mortgage broker 14 answers, lead exchange system 18 may connect potential mortgagee 16. If mortgage broker 14 does not answer, lead exchange system 18 may play a message such as "no agents are available at this time" and then terminate the call.

An example conversation guarantee may include the following rules. If the call between lead buyer 14 and potential consumer 16 is less than 10 seconds, lead exchange system 18 may not charge lead buyer 14. If the call between lead buyer 14 and potential consumer 16 is more than 2 minutes, lead exchange system 18 may charge lead buyer 14 and lead exchange system 18 may not review or refund the purchase. If the call is more than 10 seconds, but less than 2 minutes, lead exchange system 18 may review the call depending on the feedback entered by lead buyer 14. A conversation may be considered valid if: at any point lead buyer 14 or potential consumer 16 exchange contact information, or potential consumer 16 confirms interest in discussing any kind of product offered by lead buyer 14. Lead exchange system 18, or a call center verification team associated with lead exchange system 18, may review a conversation within 2 business days. If a conversation is not valid, lead exchange system 18 may refund the purchase amount.

Examples of helpful tips displayed on user interface screens may include the following tips. Lead buyer 14 may set up a voice delivery before trying pay per conversation. Lead buyer 14 should confirm interest and get the phone number of potential consumer 16 early on. Lead buyer 14 may use a land line rather than a mobile phone to reduce the possibility of a dropped call. If lead buyer 14 reaches a voicemail, lead buyer 14 has the option whether or not to leave a voicemail. Lead buyer 14 may want to leave a voicemail, since they know they have confirmed the consumer's contact information is valid. If lead buyer 14 does not want to risk connecting with potential consumer 16, and thus being charged for the conversation, lead buyer 14 should hang up immediately. Multiple lead buyers 14 may use different lead store filters to avoid contacting the same list of potential consumers 16.

As another example of operation, a particular embodiment is described in relation to mortgage broker 14 (lead buyer 14) and potential mortgagee 16 (potential consumer 16). Mortgage broker 14 may be interested in contacting potential mortgagees 16. Mortgage broker 14 may create a filter to identify particular leads that interest mortgage broker 14. For example, mortgage broker 14 may only be interested in leads for residents of Texas with a property value greater than five hundred thousand dollars and a loan to value ratio of 80%.

FIG. 8 illustrates an example of a user interface for filtering leads, according to a particular embodiment. FIG. 8 illustrates example user interface 802 of a lead store of lead exchange system 18. Mortgage broker 14 may filter leads based on lead source (e.g., publisher, website, advertising campaigns, keywords, traffic category, etc.), lead age 804, buyer feedback (e.g., contacted, application started, closed transactions, disconnected phone number, other disqualifications, etc.), communication manager feedback (e.g., call attempts on current lead, prior call attempts on lead for same phone number, prior call attempts on leads with same email address, etc.), demographic information 806 (e.g., state or zip code, home equity type, spoken language, loan to value ratio, credit scores, recent retail transactions, presence on do not call lists, etc.), or any other suitable criteria for filtering leads.

Lead exchange system 18 may identify a lead that matches a filter criteria created by mortgage broker 14. Because multiple mortgage brokers 14 may all be competing for the same leads, lead exchange system 18 may be optimized to efficiently process search requests. Lead exchange system 18 may display an interface indicating a match is found to mortgage broker 14 to indicate that lead exchange system 18 has located a matching lead and display price 808 for connecting with the lead.

FIG. 9 illustrates an example of an interface indicating a match is found, according to a particular embodiment. For example, interface 902 may display price 904 for connecting with a lead and a "Place Call Now" button 906.

Mortgage broker 14 may click "Place Call Now" button 906 of FIG. 9 to initiate a connection with potential mortgagee 16. Clicking "Place Call Now" button 906 may display an interface prompting mortgage broker 14 to enter a phone number.

Figure 10:
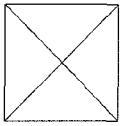
FIG. 10 illustrates an example of a user interface for contacting desired entities, according to a particular embodiment.

FIG. 10 illustrates an example of an interface for entering a phone number, according to a particular embodiment. For example, interface 1002 may display an input box 1004 for mortgage broker 14 to enter a phone number. Phone number input box 1004 may be populated with the last number used by mortgage broker 14, with a company phone number associated with mortgage broker 14, or any with suitable phone number associated with mortgage broker 14. Interface 1002 may display "Next" button 1006.

When mortgage broker 14 clicks "Next" button 2006 of FIG. 10, lead exchange system 18 may initiate a connection to potential mortgagee 16. Lead exchange system 18 may initiate a connection to potential mortgagee 16 in a manner similar to that described above with reference to FIGS. 4-8.

In particular embodiments, lead exchange server 18 may provide distributed call center functionality using a network of individual mortgage brokers 14. For example, a collection of individual mortgage brokers 14 may all request leads using the same filter. As lead exchange server 18 identifies potential consumers 16 matching the filter, lead exchange server 18 may connect potential consumer 16 with the next available mortgage broker 14 of the network using that same filter.

In particular embodiments, mortgage broker 14 may rate a lead based on the conversation mortgage broker 14 had with potential mortgagee 16. After the conversation is over, lead exchange system 18 may prompt mortgage broker 14 with an interface to rate the lead.

FIG. 11 illustrates an example of an interface to rate a lead, according to a particular embodiment. For example, interface 1102 may display a sequence of stars 1104 for rating the lead, "Done" button 1106 to terminate the transaction, and "Call Another Lead" button 1108 to continue calling additional potential mortgagees 16. In particular embodiments, interface 1102 may display a list of feedback codes. Examples of feedback codes are shown in the following table.

| Code | Description |
| --- | --- |
| BUYER_DUPLICATE | Buyer Duplicate |
| DISCONNECTED_PHONE | Disconnected Phone |
| WRONG_NUMBER | Wrong Phone Number |
| UNABLE_TO_CONTACT | Unable to Contact |
| INTERESTED | Contacted - Interested |
| CHANGED_MIND | Contacted - Changed Mind |
| NEVER_APPLIED | Never Applied |
| WRONG_PRODUCT | Wrong Product (interested in different product) |
| FALSE_MARKETING | Incentivized/False Marketing |
| DNC | Do Not Call Complaint |
| CHOSEN_PROVIDER | Chosen a Provider |
| SPAM | SPAM Complaint (Email) |
| COMPLETED_APPLICATION | Completed Application |
| CONVERTED_CUSTOMER | Converted Customer |
| OLD_LEAD | Old Lead (3+ Days) |
| DOES_NOT_QUALIFY | Contacted - Does Not Qualify |

In particular embodiments, mortgage broker 14 may not be satisfied with the conversation and may submit a refund request. Lead exchange system 18 may display an interface for mortgage broker 14 to submit a refund request.

Figure 12:
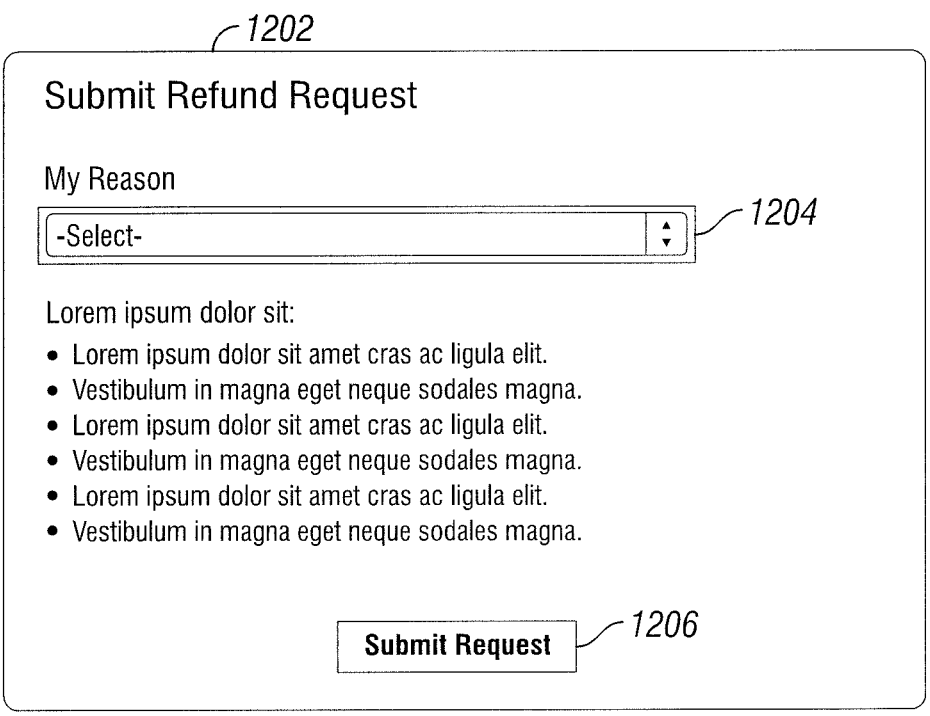
FIG. 12 illustrates an example of a user interface for requesting a refund, according to a particular embodiment.

FIG. 12 illustrates an example of an interface for submitting a refund request, according to a particular embodiment. For example, interface 1202 may display a drop down list 1204 of reasons for requesting the refund and "Submit Request" button 1206. Operator 38 may review the refund request to determine whether is refund may be warranted. Operator 38 may review a call disposition, a full or partial recording of a call, or any other suitable information related to the refund request. Examples of call dispositions are shown in the following table.

| Code | Description |
| --- | --- |
| GENERAL_VOICEMAIL | General Voicemail |
| DISCONNECTED_PHONE | Disconnected Phone |
| BUSY_TONE | Busy Tone |
| WRONG_NUMBER | Wrong Phone Number |
| HANG_UP | Hang Up |
| NEVER_APPLIED | Never Applied |
| WRONG_PRODUCT | Wrong Product (interested in different product) |
| DNC | Do Not Call Complaint |
| CHOSEN_PROVIDER | Chosen a Provider |

| Code | Description |
| --- | --- |
| OLD_LEAD | Old Lead (3+ Days) |
| NOT_INTERESTED_IN_TRANSFER | Not Interested |
| SCHEDULED_CALLBACK | Scheduled Callback |
| SUCCESSFUL_TRANSFER | Successful Transfer |
| FAILED_TRANSFER_NO_BUYER | Transfer Attempt - No Buyer Match |
| FAILED_TRANSFER_WITH_BUYER | Transfer Attempt - Buyer Refusal |
| FAILED_TRANSFER_SR | Transfer Attempt - Consumer Dropped |
| EXPIRED_TIME | Expired Time |
| EXPIRED_CALLS | Expired Calls |
| CONTACTED_NOT_QUALIFY | Does Not Qualify |
| UNABLE_CONTACT_NOT_RETURN_CALLS | Unable to Contact |
| OUT_OF_BID_FILTER | Out of Filter |
| REFUSED_RECORDING | Refused Recording |
| NEGATIVE_DEMAND_PING | Negative Demand Ping |
| DO_NOT_CALL_MATCH | Do Not Call Match |
| LANGUAGE_BARRIER | Language Barrier |
| DECEASED | Deceased |
| NO_DIAL | Consumer Not dialed |
| SUCCESSFUL_TRANSFER_VOICEMAIL | Transfer - Voicemail |
| SUCCESSFUL_TRANSFER_NO_VOICEMAIL | Transfer - No Voicemail |
| SUCCESSFUL_TRANSFER_60_SECONDS | Transfer - 60 Seconds |
| SR_UNCALLED_MATCHED_LEAD | Lead Matched - Not Dialed |
| STOP_TRANSFER_ATTEMPTS | Transfer Attempts Stopped |
| RENEW_TRANSFER_ATTEMPTS | Transfer Attempts Renewed |
| CONTACT_ATTEMPT | Contact Attempt |
| LEAD_NOT_FOUND | Lead Not Found |
| FAX_MACHINE | Fax Machine |
| CONSUMER_NEVER_REACHABLE | Consumer Not Available During Calling Window |
| CALLBACK_HOLD | Callback Hold |
| ABANDON_AGENT_NOT_AVAIL | Abandon - Agent Not Available |
| SYSTEM_ERROR | System Error |
| WRONG_PRODUCT_HOME_EQUITY | Wrong Product - Home Equity |
| WRONG_PRODUCT_REVERSE_MORTGAGE | Wrong Product - Reverse Mortgage |
| WRONG_PRODUCT_COMMERCIAL_LOANS | Wrong Product - CommercialLoan |
| WRONG_PRODUCT_REAL_ESTATE | Wrong Product - Real Estate |
| WRONG_PRODUCT_EMPLOYMENT | Wrong Product - Employment Inquiry |
| SUCCESSFUL_TRANSFER_CROSS_SALE_PURCHASE | Successful Transfer - Refinance to Purchase |
| SUCCESSFUL_TRANSFER_CROSS_SALE_REFINANCE | Successful Transfer - Purchase to Refinance |
| SUCCESSFUL_TRANSFER_CROSS_SALE_HOME_EQUITY | Successful Transfer - Cross sell to Home Equity |
| TOO_MANY_COMPANIES | Contacted by too many companies |

FIG. 13 illustrates an example of shopping cart user interface 1302, according to a particular embodiment. Lead buyer 14 may purchase a lead by selecting leads from the lead store and adding them to an electronic shopping cart.

In particular embodiments, users of lead exchange system 18 may request reports. Operator 38 may run a report to help operator 38 determine the validity of a conversation. Operator 38 may view a list of leads needing review. The report may be filterable and include fields such as lead id, phone number, first name, last name, buyer name, lead date of entry (DOE) in the lead database, transfer date, a link to a review screen, and/or other suitable fields in various embodiments. Operator 38 may run a report to view information about calls. The report may be filterable and include fields related to a call such as start date, end date, buyer, product, purchase date, call attempts, disconnect attempts, abandons, successful transfers, buyer rejects, average call duration, and/or other suitable fields in various embodiments. Lead Buyer 14 may request reports on available leads, lead contact history, billing history, or any other suitable report.

Lead exchange system 18 may categorize leads into lead bands to distinguish good leads from questionable leads. As an example, lead exchange system 18 may categorize leads as premium, certified, value, connected only, or unbanded. Lead exchange system 18 may charge lead buyers 14 more for good leads, or take a higher commission from lead submitters who submit questionable leads. Lead exchange system 18 may categorize leads into any suitable number of bands based on any suitable criteria.

In particular embodiments, lead exchange system 18 may categorize leads by calculating a consumer intent score for a lead. Lead exchange system 18 may calculate a consumer intent score by combining values assigned to buyer feedback, number of returns, quality verification feedback, voice transfers, or any other suitable value. As an example, the feedback and call disposition tables above associate a score with each value. Consumer intent calculations may include weighted coefficients assigned to particular attributes by a user, such as operator 38. Consumer intent calculations may include dynamic values, such as various feedback or call statistics, collected over time. Consumer intent scores may change as more feedback is collected. In particular embodiments, operator 38 may overwrite a calculated consumer intent score.

As a particular example, a consumer intent score may be calculated by the equation $$\frac{\sum C_i(B_i)}{\sum C_i} + \sum C_j A_j, \text{ where } B \text{ or } A = \frac{\sum \beta_n W_n(F_n)}{\sum \beta_n W_n}$$

and C represents a set of coefficients that may be entered by an operator. B represents a weighted score for a basic component or attribute, and A represents weighted or unweighted score for an adjustment component or attribute. Examples of basic components or attributes may include: voice transfer score, voice transfer quality connect score, buyer feedback interested score, buyer feedback application completed score, buyer feedback conversion score, return score, percentage of interested consumers, percentage of contacted consumers, aggregated scores based on daily call statistics, or any other suitable attribute. Examples of adjustment components may include: percentage of fraud detected or flagged, and percentage of duplicate leads. F represents calculated scores for a given time period based on a given function for each attribute. β represents a confidence value associated with each attribute and may typically be set to a value between one and zero. For example, an attribute determined based on a single data point may have a lower confidence value than the same attributed determined based on multiple data points. The number of days (e.g., 1, 2, 3, 7, 14, 21, 30, 90, 120, etc.) data is aggregated is represented by n. In particular embodiments, the equation may include different values of n for different attributes. $W_n$ represents a weight factor associated with a number of days data was aggregated. For example, data aggregated over a longer period of time may be assigned a greater weight.

While the discussion above regarding FIGS. 2-13 have used a mortgage broker and a potential mortgagee as an example, the techniques discussed therein are not limited to this example. The technological features related to computerized establishment of communication sessions (such as telephone calls) discussed above are readily applicable in other contexts. Such contexts can include various forms of business interactions where consumers identify datasets and create relationships, such as matching systems for personal relationships (e.g., dating) or business relationships (e.g., employee recruiting).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variation will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of managing a live electronic communication session, the method comprising:
    receiving, at a server, one or more parameters from a user, the one or more parameters associated with at least one communication preference of the user;
    determining, by the server, a first contact profile from a plurality of contact profiles using the one or more parameters, the first contact profile comprising a first set of information and a second set of information;
    automatically permitting, by the server, the user to electronically access the first set of information;
    preventing, using the server, the user from accessing the second set of information;
    transmitting, by the server, electronic commands configured to connect the user to a live electronic communication session;
    automatically connecting, by the server, a first contact associated with the first contact profile to the live electronic communication session;
    determining, by the server, a duration of the live electronic communication session;
    determining, by the server to permit the user to access the second set of information based on:
        the duration of the live electronic communication session; and
        a semantic analysis of a recording of at least a portion of the live electronic communication session, wherein the semantic analysis is performed automatically.

2. The method of claim 1 wherein determining to permit the user to access the second set of information comprises comparing the duration of the live electronic communication session to a first threshold.

3. The method of claim 1 wherein determining to permit the user to access the second set of information comprises analyzing a characterization of the live electronic communication session received from the user.

4. The method of claim 3, further comprising determining the accuracy of the characterization of the communication session received from the user, wherein determining the accuracy of the characterization is based on the semantic analysis of the recording of at least a portion of the communication session.

5. The method of claim 1 further comprising associating a charge with the user after determining to permit the user to access the second set of information.

6. The method of claim 1 further comprising providing the user access to the second set of information while the live electronic communication session is occurring.

7. A system comprising:
    one or more computer-readable storage media storing a plurality of contact profiles;
    a first interface configured to receive one or more parameters from a user, the one or more parameters associated with at least one preference of the user; and
    at least one processor in a server configured to:
        determine a first contact profile from a plurality of contact profiles using the one or more parameters, the first contact profile comprising a first set of information and a second set of information;
        permit the user to access the first set of information;
        prevent the user from accessing the second set of information;
        connect the user to a live electronic communication session;
        connect a first contact associated with the first contact profile to the live electronic communication session;
        determine a duration of the live electronic communication session; and
        determine to permit the user to access the second set of information by automatically analyzing:
            the duration of the live electronic communication session; and
            a recording of at least a portion of the live electronic communication session, wherein the recording is analyzed semantically.

8. The system of claim 7 wherein the processor is configured to determine to permit the user to access the second set of information at least by comparing the duration of the live electronic communication session to a first threshold.

9. The system of claim 7, wherein the processor is configured to determine to permit the user to access the second set of information at least by analyzing a characterization of the live electronic communication session received from the user.

10. The system of claim 9, wherein the processor is configured to determine the accuracy of the characterization of the communication session received from the user based on the analysis of the recording of at least a portion of the communication session.

11. The system of claim 7, wherein the processor is configured to associate a charge with the user after determining to permit the user to access the second set of information.

12. The system of claim 7, wherein the processor is configured to provide the user access to the second set of information while the live electronic communication session is occurring.

13. A non-transitory computer-readable storage medium comprising computer-readable code in a server, the computer-readable code configured to:
  receive one or more parameters from a user, the one or more parameters associated with at least one communication preference of the user;
  determine a first contact profile from a plurality of contact profiles using the one or more parameters, the first contact profile comprising a first set of information and a second set of information;
  permit the user to access the first set of information;
  prevent the user from accessing the second set of information;
  connect the user to a live electronic communication session;
  connect a first contact associated with the first contact profile to the live electronic communication session;
  determine a duration of the live electronic communication session; and
  determine, to permit the user to access the second set of information by automatically analyzing:
    the duration of the live electronic communication session; and
    a recording of at least a portion of the live electronic communication session, wherein the recording is analyzed semantically.

14. The medium of claim 13, wherein the computer-readable code is configured to determine to permit the user to access the second set of information at least by comparing the duration of the live electronic communication session to a first threshold.

15. The medium of claim 13, wherein the computer-readable code is configured to determine to permit the user to access the second set of information at least by analyzing a characterization of the live electronic communication session received from the user.

16. The medium of claim 15, wherein the computer-readable code is configured to determine the accuracy of the characterization of the communication session received from the user based on the analysis of the recording of at least a portion of the communication session.

17. The medium of claim 13, wherein the computer-readable code is configured to associate a charge with the user after determining to permit the user to access the second set of information.

* * * * *